United States Patent [19]
Collins

[11] 3,967,383
[45] July 6, 1976

[54] CIRCUMFERENCE GAUGE AND RECORDING METHOD

[75] Inventor: Terrence Collins, Whitburn, England

[73] Assignee: American Filtrona Corporation, Richmond, Va.

[22] Filed: Apr. 17, 1975

[21] Appl. No.: 568,854

[30] Foreign Application Priority Data

Apr. 17, 1974   United Kingdom............... 16838/74

[52] U.S. Cl. ................................................. 33/179
[51] Int. Cl.² ....................... G01B 3/10; G01B 3/02
[58] Field of Search .............. 33/137 R, 138, 143 L, 33/147 N, 176, 179

[56] References Cited
UNITED STATES PATENTS

| | | | |
|---|---|---|---|
| 251,575 | 12/1881 | Greenwood.......................... | 33/179 |
| 530,673 | 12/1894 | Allstadt................................ | 33/179 |
| 1,282,772 | 10/1918 | Dinhofer.............................. | 33/179 |
| 1,404,601 | 1/1922 | Gordon................................ | 33/179 |
| 3,271,564 | 9/1966 | Rosenfeld et al................... | 33/138 |
| 3,500,547 | 3/1970 | Van Haagen....................... | 33/143 L |
| 3,550,279 | 12/1970 | Fapiano............................... | 33/143 L |
| 3,744,140 | 7/1973 | Kyrk.................................... | 33/179 |

FOREIGN PATENTS OR APPLICATIONS

| | | | |
|---|---|---|---|
| 3,350 | 1/1971 | Japan.................................. | 33/176 |

*Primary Examiner*—Richard E. Aegerter
*Assistant Examiner*—Richard R. Stearns
*Attorney, Agent, or Firm*—Holman & Stern

[57] ABSTRACT

A circumference-measuring gauge comprising a tape curved over an intermediate portion into a closed loop with its two end portions extending away from the loop in opposite directions, two mounting members one fixed relative to each end portion of the tape and mounted for relative movement towards and away from one another to increase or decrease the loop circumference, and means responsive to the distance apart of two datum points one fixed relative to each mounting member to indicate the size of the loop.

25 Claims, 13 Drawing Figures

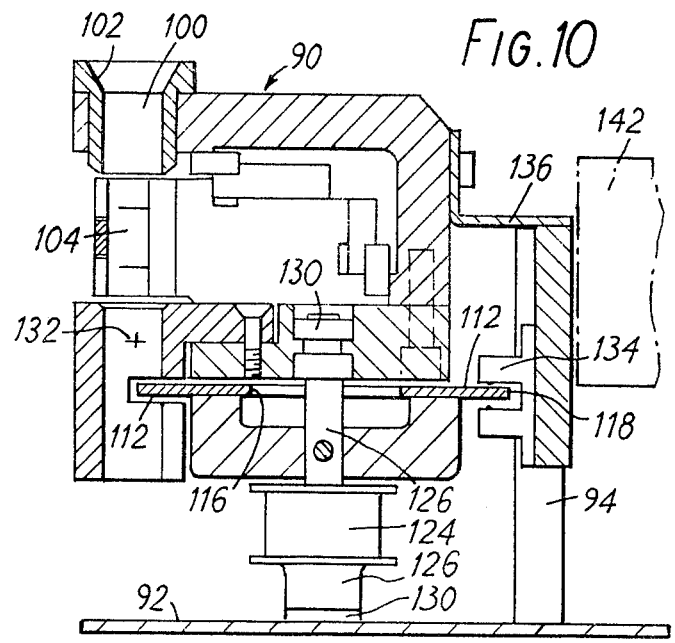
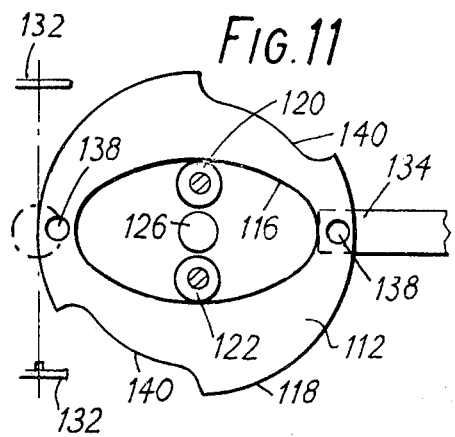
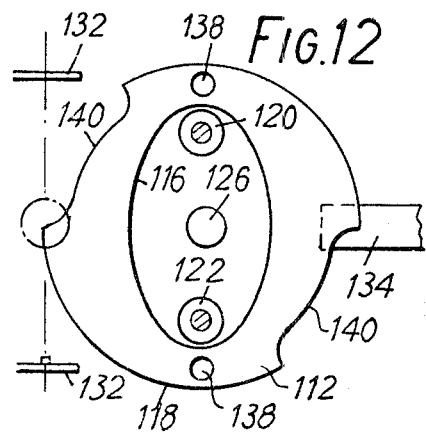
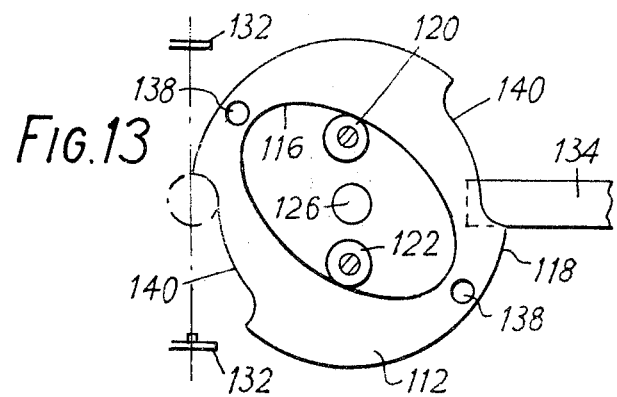

CIRCUMFERENCE GAUGE AND RECORDING METHOD

This invention relates to a circumference gauging method and apparatus.

The measurement of rod circumference or diameter is of importance in a number of fields; for example the monitoring of the circumference of rod samples is an important quality control factor in the commercial production of cigarette filters, uniformity of circumference of the filter rods being essential for the satisfactory operation of the automatic machines employed for the assembly of filter tipped cigarettes.

Heretofore the circumference of filter rod samples has been checked by means of a pneumatic device, the rod being presented end-on to an orifice of larger predetermined diameter through which air is forced at a predetermined pressure drop; the difference between the pressure drop across the unobstructed orifice and that across the orifice when obstructed by the rod is used as a measure of rod circumference. Such a gauging method lacks accuracy and reliability for porous rods such as certain cigarette filters, since air can escape through as well as around the rod, and this factor may vary from rod to rod. Furthermore the prior device is wasteful of energy since it is normal to maintain the air flow continuously, whether or not a measurement is being taken.

The present invention provides a gauge comprising a tape curved over an intermediate portion into a closed loop with its two end portions extending away from the loop in opposite directions, two mounting members one fixed relative to each end portion of the tape and mounted for relative movement towards and away from one another to increase or decrease the loop circumference, and means responsive to the distance apart of two datum points one fixed relative to each mounting member to indicate the size of the loop. In use, a standard rod of known dimensions, e.g. of metal, is disposed axially through the loop, and the mounting members moved relatively away from one another to draw the loop into engagement around the rod, a "zero" reading thus being obtained on the indicator means; the loop is then relaxed and the steps repeated using a test rod to be gauged. Normally, in a calibration using a standard rod, the indicator will be adjusted to display the known dimension or measurement of the standard, and will then give a direct reading of the corresponding measurement or dimension of subsequent test rods. Alternatively the indicator may be calibrated to indicate the difference between corresponding standard and test rod measurements or dimensions. The measurement chosen for gauging and display will normally be circumference, since the change in loop circumference is equal to the change in distance between the datum points, but if desired it could be diameter or radius which are of course linearly related to circumference, or even cross-sectional area, according to the calibration of the indicator.

One of the mounting members may be fixed, or both may be movable towards and away from one another. In the latter case the two members may be linked, e.g. by pivoted arms, so that they are constrained to move together towards or away from one another with their displacements in a fixed ratio, preferably equal. The two members are preferably resiliently biased apart, so that they have to be pushed together to relax the loop, the members then separating under the bias to draw the loop around the inserted rod with a force that does not vary appreciably from measurement to measurement.

The tape should be substantially inextensible under its conditions of use, polyester being for example a suitable material. The tape is preferably so shaped, e.g. being symmetrical about a longitudinal axis, that when the end portions are drawn apart to engage the loop around the rod no resultant turning moment is exerted on the rod. A convenient form of tape is one having a tongue longitudinally spaced from a notch or aperture through which the tongue is threaded to form the closed loop. For accuracy and ease of replacement the tape may be provided mounted ready looped in the form of a cassette or cartridge; the end portions of the looped tape are adhered or otherwise firmly affixed to respective separate plates, e.g. of plastics material, the inwardly directed end portions of which extend arcuately towards one another around a portion of the loop circumference to provide between them a guard and guide for the loop. The said end portions of the plates preferably each curve through about 90° of arc so as to form a generally semi-circular guard when they are in abutment with the loop at its greatest circumference; and the free innermost end of at least one of the plates preferably has a tangentially projecting tongue which, when the plates are separated to tighten the loop, assists in maintaining the plates in alignment and in protecting and controlling the loop. The cassette or cartridge is mounted in the gauge with one plate on each mounting member, e.g. by way of holes machined through the outer end portions of the plates to match studs on the mounting members.

In the embodiment where one of the mounting members is fixed and the other is movable, the movable member may be part of or connected to a transducer which converts linear changes of position of the movable member into voltage changes. Where both mounting members are movable, each may be part of or connected to the transducer, though where the members are linked as described above so that their displacements are in a fixed ratio, then again only one of them need be connected to or part of the transducer. For the gauging and display of circumference, diameter or radius, a linear transducer may be employed which converts positional changes linearly into voltage changes; the output from the linear transducer may be fed via standard magnification and zero circuitry to a digital panel meter, which may be calibrated to display a figure corresponding to the required dimension of the loop in the tape.

The linear transducer, digital panel meter and circuitry mentioned above are all standard commercially available items.

In one embodiment, movement of the movable mounting member or members is controlled by means of a cam. For example the mounting members are resiliently biased apart as described above, the or each movable mounting member being rigidly attached to a cam follower, the cam being movable between a position or positions in which the mounting members are drawn together against the spring bias to relax the loop for acceptance or release of a rod, and a position or positions in which it allows the mounting members to move apart under the spring bias to cause the loop to grip a rod for gauging. Thus where both mounting members are movable, the cam may be a generally annular body whose inner peripheral surface is generally elliptical; each mounting member has a cam follower engaging with the elliptical cam surface, these cam followers being disposed at diametrically opposed positions around the ellipse; thus when the cam is rotated to a position such that the cam followers are disposed at opposite ends of the minor axis of the ellipse, the cam followers and hence the mounting members are drawn together to relax the loop in the tape, and on rotation of the cam away from this position the cam followers and mounting members are permitted to move apart controlledly under the spring bias to tighten the loop. With this arrangement, the mounting members are linked together as generally described above, in this case by way of the cam followers and cam, for controlled movement together towards and away from one another with equal displacement, so that it is only necessary for one of the mounting members to be connected to and operate the indicator means.

Movement of the cam may be effected by means of a motor, and in this case the cam may have a second cam surface (e.g. its outer peripheral surface in the case of an annular cam) which controls or helps to control operation of the motor. In one arrangement, the following cycle may occur: rotation of the cam to bring the mounting members to their closed position with the loop at maximum circumference brings the second cam surface to a position at which it causes the motor to stop; insertion of a test rod or standard through the relaxed loop activates the motor to rotate the cam to a second position at which the mounting members have moved towards their open position under the spring bias to tighten the loop around the rod, the second cam surface in this second position causing the motor to stop again; after a brief time delay to allow measurement, the motor starts automatically to rotate the cam to a third position in which the mounting members are drawn partially to their closed position, relaxing the loop for removal of the rod, the second cam surface in this third position causing the motor to stop; removal of the rod activates the motor to return the cam to its first position. This arrangement is particularly useful in the case where the tape is mounted with the axis of its loop vertical; the cam, with its axis of rotation parallel to the axis of the loop, can then be of a shape such that in its first position mentioned above it provides a stop to support the rod inserted through the loop, and at its third position mentioned above it allows the rod to drop vertically through the loop and past the cam. This arrangement is particularly appropriate for the situation in which rods are fed automatically to the gauge.

A single gauge according to the invention can cope with rods having a wide range of diameters, covering the whole range of rod size normally encountered in cigarette filter manufacture. This is a distinct advantage over the prior practice, where more than one pneumatic device was necessary for measurement of the whole range of rod diameters.

Gauges according to the invention, employed on standard cigarette filters having a circumference of about 24.50 mm, have given repeatable circumference measurements accurate to within 0.01 mm.

Embodiments of the invention will now be described, purely by way of example, with reference to the accompanying drawings, in which:

FIGS. 9 and 10 are sectional views along lines IX—IX and X—X respectively of FIG. 8, and FIGS. 11 to 13 are plan veiws showing diagrammatically the operation of the cam disc and associated parts of FIGS. 8 to 10.

Figure 1:
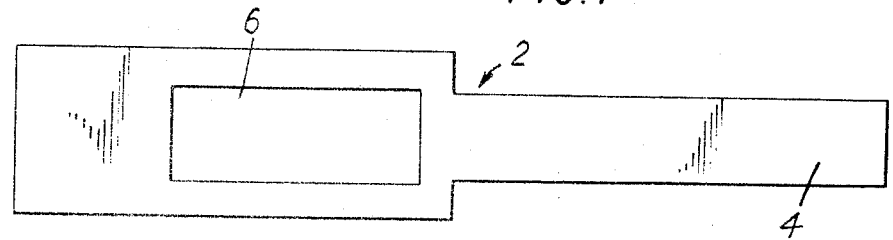
FIG. 1 is a plan view of a tape according to the invention.
Figure 2:
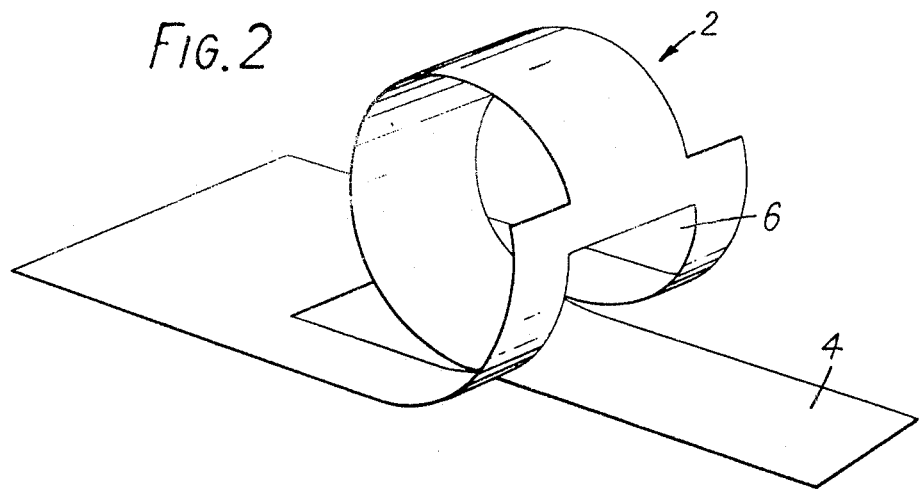
FIG. 2 is a perspective view of the tape formed into a closed loop ready for use.

Referring to FIGS. 1 and 2 of the drawings, the tape 2, of polyester or like material, has a tongue 4 at one end which in use is threaded through aperture 6 in the body of the tape to form a closed loop. It will be seen that by moving the free ends of the looped tape towards or away from one another, the circumference of the loop will be be increased or decreased.

Figure 3:
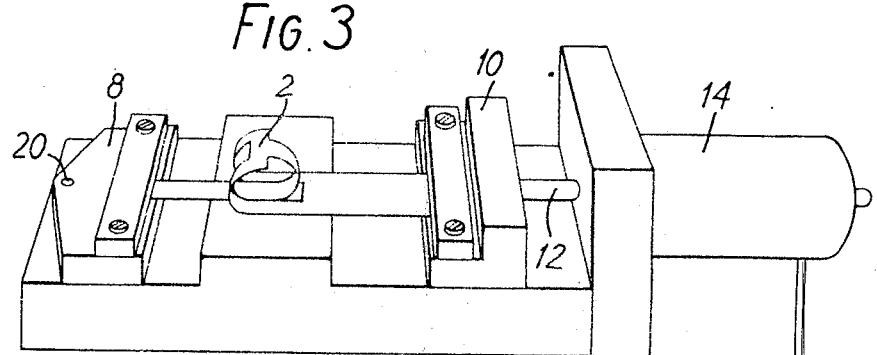
FIG. 3 is a perspective view showing parts of a gauge according to the invention.

FIG. 3 shows the looped tape with one end clamped to a fixed mounting member 8 and the other to a mounting member 10 which is movable towards and away from the fixed mounting member in a direction parallel to the extending end portions of the tape. Any conventional means (e.g. a cam) may be employed for effecting controlled movement of the member 10. Member 10 is connected by a rod 12 to a linear transducer 14 which is in turn connected by conventional circuitry to a digital panel meter 16 provided with a control knob 18. Movement of the member 10 towards or away from the datum point 20 on the fixed member produces a linear change in the voltage output from transducer 14. For calibration, a standard rod of known dimensions, e.g. circumference, is inserted through the loop of the tape, and member 10 is moved away from datum point 20 until the tape grips the rod; the reading of the indicator panel is then adjusted, e.g. to zero or to display the known dimension of the rod; member 10 is then moved towards datum point 20, the standard rod removed, a rod to be tested inserted in the loop, and member 10 then moved away from datum point 20 until the loop grips the test rod. The indicator panel then displays the corresponding dimension of the test rod or its difference from that of the standard rod.

Figure 4:
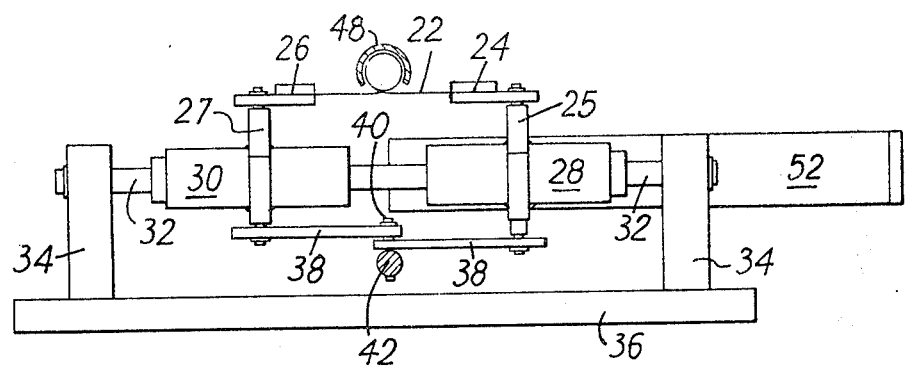
FIG. 4 is an end elevation, partly in section, of another gauge according to the invention.
Figure 5:
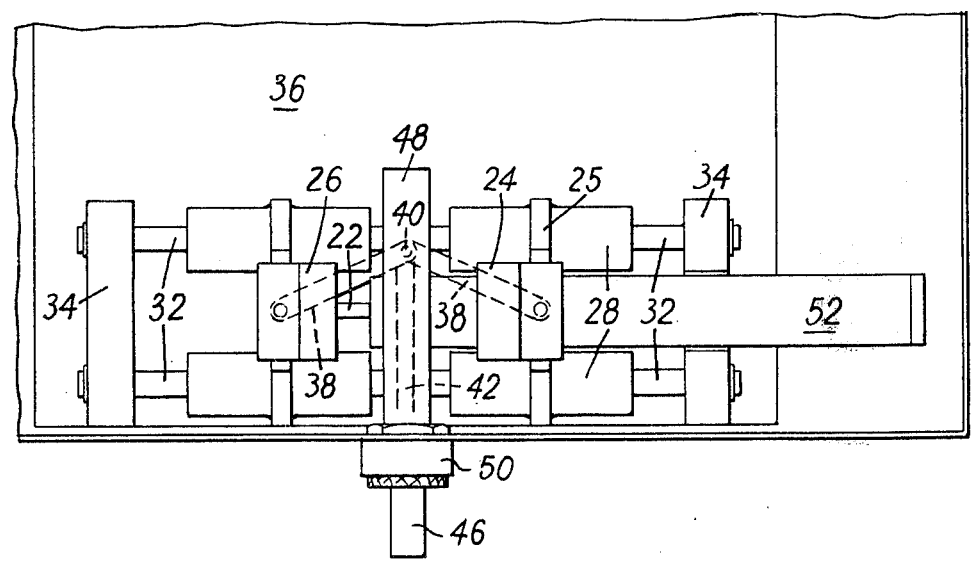
FIG. 5 is a plan view of the gauge of FIG. 4.
Figure 6:
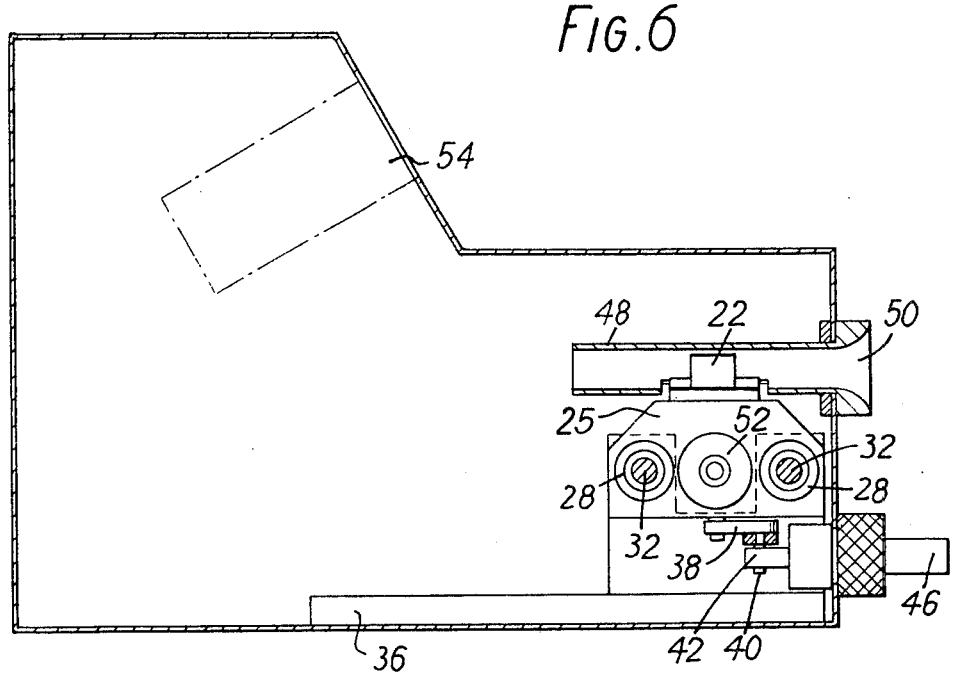
FIG. 6 is a side elevation, partly in section, of the gauge of FIG. 4.

In the embodiment shown in FIGS. 4 to 6, each clamped end of the looped tape is movable.

Referring to FIGS. 4 to 6, the looped tape 22, which is, for example, of the form illustrated in FIGS. 1 and 2, has one end clamped in clamp 24 and the other in clamp 26; clamp 24 is fixedly mounted on a plate 25 which is in turn fixedly mounted on a first pair of sliding members 28 disposed below and on either side of clamp 24, and clamp 26 and plate 27 are similarly mounted fixedly on a second pair of sliding members 30. Clamp 24, plate 25 and sliding members 28 constitute one mounting member of the gauge, and clamp 26, plate 27 and sliding members 30 the other. The members 28 and 30 are slidable towards and away from one another on guides 32 which are fixedly mounted by guide supports 34 on a base 36. The sliding members 28 and 30 are connected to each other by operating arms 38 which are pivoted to each other where they meet by pin 40, the distal ends of the operating arms being pivoted relative to the sliding members. Thus, horizontal movement of pivot pin 40 perpendicular to the guides 32 moves the sliding members and hence the clamps 24 and 26 towards or away from one another, increasing or decreasing the circumference of the loop in tape 22. Such movement of pivot pin 40 is effected and controlled in this embodiment by a rod 42 and a biasing spring (not shown) in transducer 52 and operating on the mounting member 24, 25, 28. The rod 42 is pivotally attached at one end to pivot pin 40 and is provided at the other end with a button 46; the biasing spring urges mounting members 28 and 30 and clamps 24 and 26 towards a position in which the end portions of tape 22 are drawn apart to reduce the circumference of the loop in the tape; depression of button 46 against the spring loading causes movement of rod 42 and hence pivot pin 40 and operating arms 38 from their rest positions to move mounting members 28 and 30 and clamps 24 and 26 closer together against the biasing spring in the transducer, thus increasing the circumference of the loop in the tape to allow for insertion or removal of a test rod or standard; release of the button allows the mounting members to move apart under the action of the biasing spring in transducer 52, with tightening of the loop around an inserted rod with a force that is substantially constant from test to test, arms 38 and pins 40 being moved to shift rod 42 back towards its extended rest position. In this embodiment a guide tube 48 extending horizontally at right angles to the direction of movement of the clamps, i.e. parallel to the direction of movement of pivot pin 40, is provided for insertion and withdrawal of the test or standard rods, the under portion only of the tube being cut out at the location of the tape to facilitate mounting and replacement of the looped tape whilst providing a guard and guide for the upper portion of the loop periphery.

In a modified embodiment the looped tape is provided in the form of a cassette, e.g. as described below with reference to FIG. 7, in which case the tube 48 can be in two separate sections with a gap therebetween to accommodate the cassette.

Tube 48 has a flared entry port 50 through which a test or standard rod is introduced. When the rod is to be introduced into the tube 48 and through the loop of the tape, the loop, by depression of button 46, is relaxed to or towards its maximum diameter; button 46 is then released to tighten the loop until its grips the rod, the displacement of members 28 caused by this operation operating a linear transducer 52 as described in the previous embodiment. The output from the linear transducer is transmitted as previously described by conventional zero circuitry (not shown) to a digital member 54 which is calibrated to display e.g. the circumference of the rod (or the difference in circumference from that of a standard control rod), e.g. in millimetres. The calibration of the apparatus by means of a standard control rod follows the procedure described with reference to FIGS. 1 to 3. To make a calibration, a standard control rod is advanced into the loop in the tape whilst button 46 is depressed, button 46 is released so that the loop grips the rod, and the reading displayed on meter 54 is then adjusted, if necessary, to zero or to the known dimension, e.g. circumference, of the rod.

The embodiment described above with reference to FIGS. 4 to 6 can be modified by employing, instead of the illustrated mechanism comprising the button, rod, pivot pin and operating arms, a cam and cam follower arrangement along the lines previously indicated, the cam preferably being driven by a motor.

Furthermore, whilst FIGS. 3 to 6 illustrate embodiments in which the axis of the loop in the tape extends horizontally, this axis may in general have any orientation and can with advantage be disposed vertically, especially if test rods are to be fed automatically to the gauge. The cam and cam follower embodiment is particularly advantageous in the latter case of a gauge having the loop axis disposed at an inclination to the horizontal, especially when the cam is shaped to provide a stop or support for the rod when first inserted and to let the rod fall therepast after a measurement has been taken.

Figure 7:
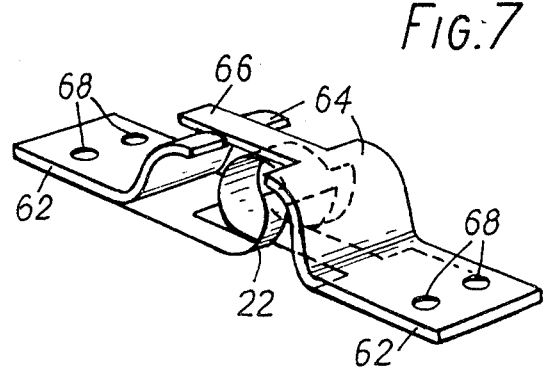
FIG. 7 is a perspective view of a tape according to the invention in cassette form.
Figure 8:
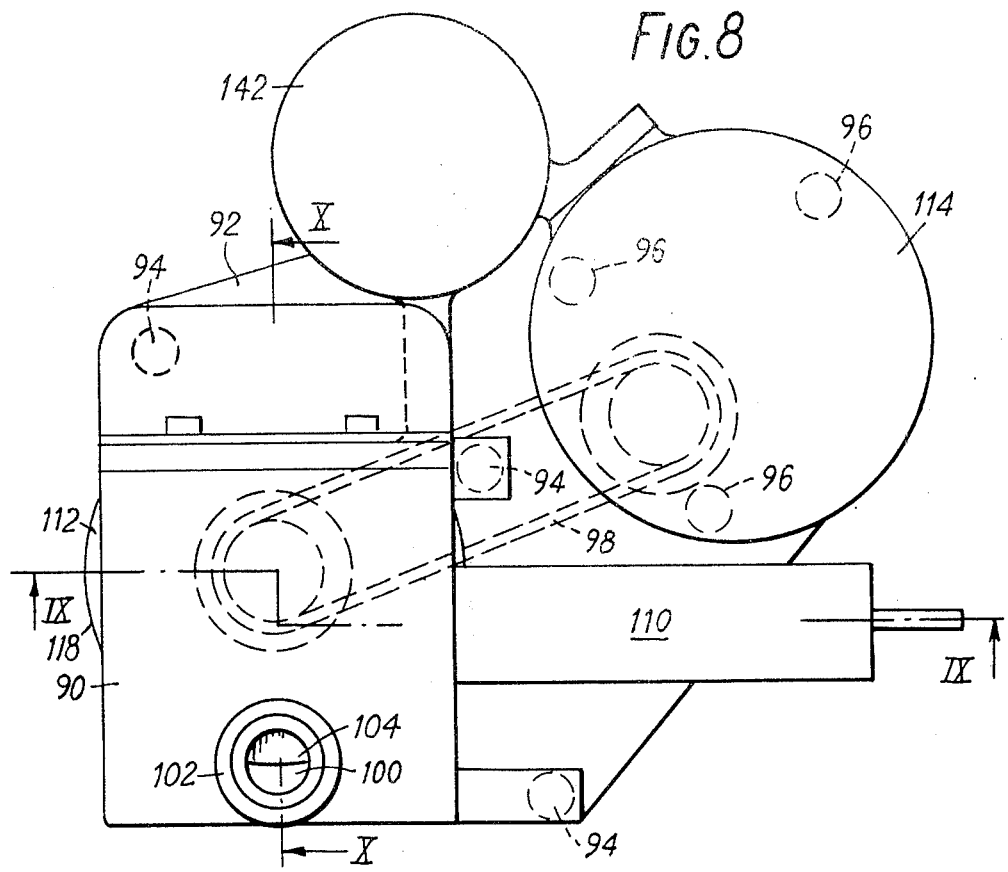
FIG. 8 is a plan view showing parts of another gauge according to the invention.
Figure 9:
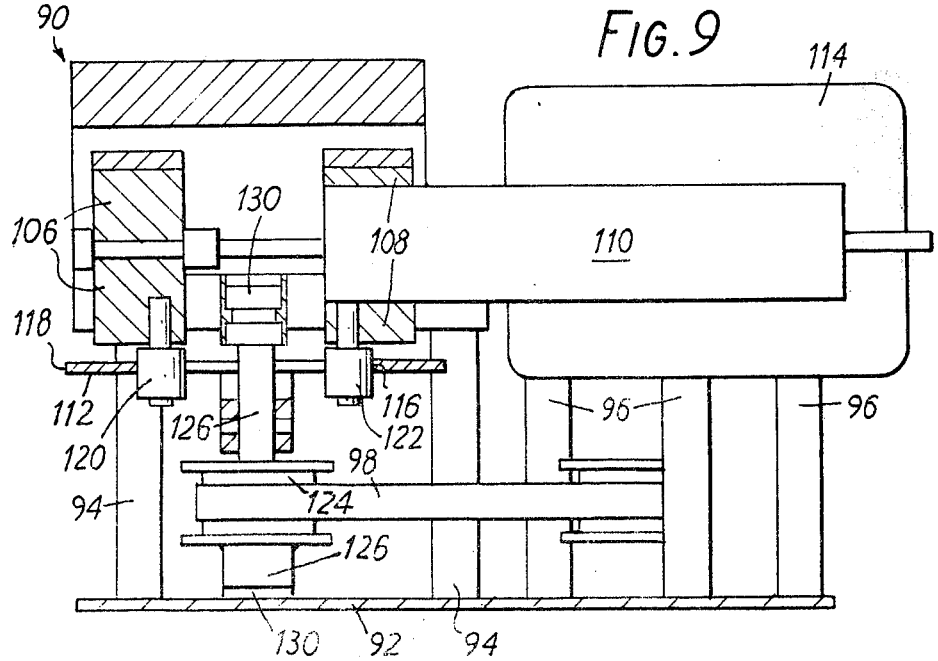

FIG. 7 of the accompanying drawings illustrates a cassette according to the invention in which the tape 22 has its end portions adhered to respective separate plastics (e.g. polyacrylate) plates 62 whose innermost ends 64 extend arcuately towards one another to provide, when in abutment, a semi-circular shield or guide extending freely around the opposed peripheral portion of the loop in the tape. The innermost end 64 of one plate 62 is shown as being formed with a tangential extension 66 fitting through a complementary notch or recess in the other plate. When plates 62 are drawn apart or brought together during operation of the gauge this extension assists in maintaining the plates in correct alignment and in providing protection and control over the loop in the tape. One or more extensions, with or without mating notches, can be provided on one or both plates. Use of such a cassette facilitates tape replacement, one plate simply being affixed to each mounting member, e.g. by means of holes 68 formed for engagement with corresponding pins or studs on the mounting members. As previously explained, such cassettes may be used with advantage in place of the tape mounting arrangements illustrated in FIGS. 3 to 6.

FIGS. 8 to 13 illustrate a machine of the type previously mentioned in which the rods are fed vertically through a tape having its loop axis vertical; movement of the mounting members is controlled by cam followers engaging the inner cam surface of a horizontal motor driven annular disc, the disc being so formed as to support the lower end of the rod as it is accepted and measured and to let it drop therepast as it rotates further to relax the tape to release the rod after measurement.

The apparatus shown has a measuring head 90 supported on base plate 92 by legs 94, head 90 supporting a vertical entry tube 100 for the rods provided with a flared entry port 102. In register with tube 100 is the looped tape 104, in the form of a cassette as shown in FIG. 7, the loop of the tape having its axis vertical and its two plates 62 (FIG. 7) attached respectively to movable mounting members 106 and 108, the latter being attached to and operating a linear transducer 110 with associated magnification and zero circuitry to a digital panel meter (not shown) as described for previous embodiments. The transducer is resiliently biased to force members 106 and 108 apart, i.e. to tighten the loop in tape 104.

Disposed below the tape and mounting members is a horizontal disc 112 of generally annular shape which is rotatable about its vertical axis by electric motor 114. Motor 114 is mounted on base plate 90 by legs 96 and has a belt drive 98 for driving disc 112 via pulley 124 on the shaft 126 of a yoke 128 to which disc 112 is secured; shaft 126 is mounted at either end in bearings 130 in the head and base plate. The disc has an elliptical inner cam surface 116 and a profiled outer rim 118 which in some rotational positions intrudes into the line of tube 100 to support a rod extending through the loop of tape 104 and in others leaves the tube clear so that a rod can fall through the tube past the disc.

Two cam followers 120 and 122 attached rigidly to the respective mounting members 106 and 108 engage with the cam surface 116 in diametrically opposed positions. The resilient bias of transducer 110 maintains the cam followers forced apart in or towards engagement with cam surface 116, rotation of the cam surface sequentially drawing the followers together against the bias to relax the loop in tape 104 and allowing them to separate under the bias to tighten the loop.

Operation of the motor in use is controlled by photocell switches 132 and 134 and time switches (not shown). Photocell 134, supported on head 90 by bracket 136, is disposed with light source and light responsive element on opposite sides of the rim of disc 112. Photocell 132 is disposed, as indicated diagrammatically at 132 in FIGS. 10 and 11, with light source and sensitive element above disc 112 on opposite sides of the space occupied by a rod when in position on disc 112 for measurement by tape 104.

The operation of the device is best illustrated with reference to FIGS. 11 to 13 showing the disc in various rotational positions. As there shown, photocell 132 sees light at all times unless blocked by the presence of a rod; photocell 134 sees light only when one of holes 138, or one of profiled rim portions 140, of the disc comes between light and cell. In the position shown in FIG. 11, both cells see light and the motor and disc are stopped in this position with cam followers 120 and 122 closest together and the loop in tape 104 at its greatest diameter. A rod dropped through tube 100 will rest on disc 112, blocking cell 132, this activating motor 114 to rotate disc 112 to the position shown in FIG. 12 when cell 134 again sees light, this temporarily deactivating motor 114 to maintain disc 112 in the FIG. 12 position for a short time delay; during this rotation the rod still rests on disc 112 and the cam followers move apart to the greatest extent permitted by the rod as tape 104 tightens around it under the resilient bias of the transducer. At the end of the time delay, during which the measurement on the rod is recorded as described in previous embodiments, the motor restarts and moves the disc to the position shown in FIG. 13, where the cam followers have been drawn together to relax the loop in tape 104 from around the rod which is no longer supported by disc 112 and hence drops out of tube 100; when the rod has dropped, with cell 132 again seeing light and cell 134 not, the motor starts again and moves disc 112 to a position equivalent to that of FIG. 11, where both cells again see light and the motor is stopped when the loop in tape 104 is at its greatest diameter and ready to accept another rod for measurement.

A vibrator 142 is preferably attached as shown to vibrate the head to settle the tape before each new rod is measured, this preferably being operated automatically when the disc reaches the FIG. 12 position.

Whilst the invention has been described mainly in terms of the measurement of the circumference of cigarette filters, it will be appreciated that it is applicable to circumference measurements of rods in general. It will further be understood that whilst reference is made above to datum points, these may be purely notional, it not being necessary for either mounting member to bear an identifiable datum point.

It will be evident that various modifications can be made in the illustrated embodiments without departing from the essentials of the invention. For example, in the embodiment of FIGS. 8 to 13, the disc 112 is shaped to provide two measurement cycles in one complete revolution, and although this is evidently the simplest arrangement it could be shaped to provide only one, or more than two, measurement cycles in each complete revolution. Furthermore, whilst the disc 112 is shown as having profiled recesses in its outer rim, these could be replaced by appropriately shaped slots in the annular portion of a disc. In another modification, the components of photocell 134 need not be arranged on either side of the main disc 112, but on either side of a supplementary disc also centred on and rotating with shaft 126, this supplementary disc being shaped and/or provided with a hole or holes to give the appropriate communication between the light source and light-sensitive element of photocell 134 to ensure the proper sequence of operations in rotation of the shaft 126. Each of these variations, or any combination of two or more of them, could readily be applied to the embodiment as illustrated in FIGS. 8 to 13.

I claim:

1. A measuring gauge comprising a tape including an immediate portion forming means defining a closed loop with its two end portions extending away from the loop in opposite directions, two mounting members, one fixed relative to each end portion of said tape and mounted for relative movement towards and away from one another to increase or decrease the loop circumference, and means responsive to the distance apart of two datum points, one fixed relative to each mounting member to indicate the size of said loop, said end portions of said looped tape being firmly affixed to respective separate plates, said plates having inwardly directed end portions extending arcuately towards one another around a portion of the circumference of said loop, and said plates being fixed, one to each of said two mounting members.

2. A gauge in accordance with claim 1 wherein said tape has a tongue longitudinally spaced from an aperture, said tongue being threaded through said aperture to form said closed loop.

3. A gauge in accordance with claim 1 further including support means, one of said mounting members being fixed relative to said support means and the other of said mounting members being movable relative to said one mounting member.

4. A gauge in accordance with claim 1 including means resiliently biasing said mounting members apart.

5. A gauge in accordance with claim 1 wherein said responsive means comprises a transducer, means operatively connecting said transducer to a movable mounting member, means in said transducer generating an electrical signal which is a function of said distance apart, and display means receiving said signal and displaying the value of said distance or a function thereof.

6. A gauge in accordance with claim 1 further including cam means and cam follower means and wherein said relative movement of said mounting members is controlled by means of said cam means, said members being resiliently biased apart and a movable mounting member being rigidly attached to said cam follower means and means being provided for moving said cam means between a position or positions in which said mounting members are drawn together against said bias to open said loop for acceptance or release of a rod, and a position or positions in which said mounting members are biased apart to cause said loop to grip a rod.

7. A gauge in accordance with claim 6 wherein said cam means is a generally annular body having an inner peripheral cam surface for engagement with said cam follower means, said cam means being rotatable and said cam surface being of such a profile that on rotation said mounting members are sequentially drawn together to relax said loop and then allowed to separate under the resilient bias to tighten said loop.

8. A gauge in accordance with claim 7 wherein said means for moving said cam means comprises motor means.

9. A gauge in accordance with claim 8 further including photocell means operatively associated with said motor means for actuating said motor means.

10. A gauge in accordance with claim 6 wherein both said mounting members are movable, and wherein said cam means is a generally annular body having an elliptical inner peripheral cam surface, said cam follower means comprising a pair of cam follower members disposed at diametrically opposed positions around said ellipse.

11. A gauge in accordance with claim 1 wherein said end portions of the plates each curve through about 90° of arc so as to form when in abutment, a guard for said loop.

12. A gauge in accordance with claim 11 wherein said end portion of at least one of said plates has a tangentially projecting tongue and the other of said plates has a notch slidably receiving said tongue to assist in maintaining said plates in alignment when they are separated to tighten the loop.

13. A gauge in accordance with claim 1 further including support means, both of said mounting members being movable relative to said support means.

14. A gauge in accordance with claim 13 including means linking said two mounting members to each other so as to move said mounting members together towards or away from one another with their displacements in a fixed ratio.

15. A gauge in accordance with claim 14 wherein said fixed ratio is one to one.

16. A gauge in accordance with claim 1 wherein said means responsive to the distance apart of two datum points to indicate the size of said loop includes transducer means and wherein at least one movable mounting member moves to operate said transducer means which converts positional changes into electrical signals indicative of the size of said loop.

17. A measuring tape comprising an elongated element including an intermediate portion forming means defining a closed loop with its two end portions extending away from the loop in opposite directions, said end portions of said looped element being firmly affixed to respective separate plates, said plates having inwardly directed end portions extending arcuately towards one another around a portion of the circumference of said loop.

18. A tape in accordance with claim 17 wherein said elongated element has an aperture therein, tongue means formed at one end thereof, said tongue means being threaded through said aperture to define said closed loop.

19. A tape in accordance with claim 17 which is symmetrical about its longitudinal axis.

20. A combination in accordance with claim 17 wherein said end portions of said plates each curve through about 90° of arc and are in abutment with said loop at its greatest circumference to form a generally semi-circular guard therefor.

21. A combination in accordance with claim 17 wherein said end portion of at least one of said plates has a tangentially projecting tongue and the other of said plates has a notch slidably receiving said tongue to assist in maintaining said plates in alignment when they are separated.

22. A measuring gauge comprising, in combination, a tape including an intermediate portion forming means defining a closed loop with its two end portions extending away from the loop in opposite directions, two mounting members, one fixed relative to each end portion of said tape and mounted for relative movement towards and away from one another to increase or decrease the loop circumference, and means responsive to the distance apart of two datum points, one fixed relative to each mounting member to indicate the size of said loop, means resiliently biasing said mounting members away from each other to tighten said loop, cam means comprising a generally annular body having an inner peripheral cam surface, cam follower means including at least one cam follower member attached to a movable mounting member and operatively engaging said cam surface, said cam means being rotatable and said cam surface having first portions which, when engaged by said cam follower means, moves said mounting members towards each other against said resilient bias to loosen said loop for acceptance or release of a rod to be measured, and second positions which permit said resilient bias to move said mounting members away from each other to tighten said loop around a rod to be measured, motor means operatively associated with said cam means to rotate said cam means, and control means for actuating and deactuating said motor means for rotating and stopping rotation of said cam means, said control means including means for actuating said motor means to rotate said cam means to a first position in which said cam follower means engage said first portions of said cam surface and said loop is at its maximum circumference, means to deactuate said motor means in said first position to permit insertion of a rod to be measured into said loop, means to again actuate said motor means after the rod to be measured is inserted into said loop to rotate said cam means to a second position in which said cam follower means is juxtaposed to said second portions of said cam surface to permit said resilient bias to tighten said loop around the rod to be measured, means to deactuate said motor means in said second position to allow measurement, and means to again actuate said motor means to rotate said cam means to a third position in which the loop is loosened, means to deactuate said motor means in said third position to permit removal from said loop of the rod that has been measured, said means for actuating said motor means to rotate said cam means to said first position being activated on removal of the rod that has been measured from said loop.

23. A gauge in accordance with claim 22 wherein said control means includes photocell means operatively associated with said motor means for actuating and deactuating said motor means.

24. A gauge in accordance with claim 22 wherein said tape is mounted with the axis of said loop extending vertically and said cam means is arranged with its axis of rotation parallel to the axis of said loop, said cam means being of a shape such that in said first and second positions it provides a stop to support the rod inserted through said loop and in its third position it allows the rod to drop through said loop and past said cam means.

25. A gauge in accordance with claim 22 including vibrator means operable to vibrate the gauge so as to ensure relaxation of said loop of said tape to its relaxed position prior to measurement of a new rod.

* * * * *